United States Patent [19]
Srinivasan

[11] Patent Number: 5,754,630
[45] Date of Patent: May 19, 1998

[54] SYSTEM AND ASSOCIATED METHOD FOR MULTIPLE EXTENSION ROUTING VIA AN ADVANCED INTELLIGENT NETWORK (AIN)

[75] Inventor: Thiru Srinivasan, Highlands Ranch, Colo.

[73] Assignee: U S West, Inc., Englewood, Colo.

[21] Appl. No.: 613,962

[22] Filed: Mar. 8, 1996

[51] Int. Cl.⁶ .............................. H04M 3/50; H04M 3/58
[52] U.S. Cl. .................. 379/88; 379/212; 379/213; 379/221
[58] Field of Search .................... 379/207, 201, 379/214, 212, 210, 89, 88, 67, 221

[56] References Cited

U.S. PATENT DOCUMENTS

| | | | |
|---|---|---|---|
| 4,608,460 | 8/1986 | Carter et al. | 379/71 |
| 4,827,500 | 5/1989 | Binkerd et al. | 379/88 |
| 4,926,462 | 5/1990 | Ladd et al. | 379/67 |
| 5,027,384 | 6/1991 | Morganstein | 379/67 |
| 5,127,004 | 6/1992 | Lenihan et al. | 379/67 X |
| 5,185,781 | 2/1993 | Dowden et al. | 379/67 |
| 5,199,062 | 3/1993 | Von Meister et al. | 379/67 |
| 5,329,581 | 7/1994 | Friedes et al. | 379/201 X |
| 5,375,161 | 12/1994 | Fuller et al. | 379/57 |
| 5,506,890 | 4/1996 | Gupta et al. | 379/67 |
| 5,509,060 | 4/1996 | Hall et al. | 379/207 |
| 5,515,422 | 5/1996 | McLarupy et al. | 379/67 |
| 5,555,553 | 9/1996 | Jousson | 379/214 |
| 5,592,541 | 1/1997 | Fleischer, III et al. | 379/211 |

*Primary Examiner*—Thomas W. Brown
*Attorney, Agent, or Firm*—Holme, Roberts & Owen

[57] ABSTRACT

A multiple extension routing via AIN system and method is disclosed. The method and system concerns rerouting an incoming call from an incoming caller to a single telephone number to at least one of a plurality of destination telephone numbers corresponding to at least one of a plurality of persons capable of being reached via the single telephone number is disclosed. The method may comprise the steps of playing at least a first message to the incoming caller to provide a plurality of routing options corresponding to a plurality of persons capable of being reached via the single telephone number, processing at least a first input from the incoming caller in response to the first message, the first input corresponding to a first of the plurality of persons, and rerouting the incoming call to the first of the plurality of persons via a first of the plurality of destination telephone numbers.

21 Claims, 7 Drawing Sheets

5,754,630

1

SYSTEM AND ASSOCIATED METHOD FOR MULTIPLE EXTENSION ROUTING VIA AN ADVANCED INTELLIGENT NETWORK (AIN)

FIELD OF THE INVENTION

The present invention relates to a method and system for facilitating communication between persons, and in particular, to a method and system for multiple extension routing via an AIN.

BACKGROUND OF THE INVENTION

Numerous advances have been made in the telecommunications field, and specifically, in the manner in which individuals may communicate with each other. For example, voice communications between individuals may be established via standard (e.g., land line) telephones or via cellular (e.g., wireless) telephones.

In order to communicate with a selected individual via a telephone, a party may generally attempt to communicate with the individual by placing a telephone call to a specific telephone number, which may correspond with a location at which the individual to be reached is likely located. For example, a party attempting to communicate with an individual during regular business hours may place a telephone call to the individual's work place, thereby facilitating timely communication between the party and the individual. In other instances, if the party attempting to communicate with the individual believes that the person is not at home nor at work, the party may attempt to reach the person by dialing the individual's cellular telephone number or pager telephone number, or alternatively, by dialing the person's facsimile machine to leave a facsimile message.

One approach for facilitating communication between parties concerns call forwarding, whereby the potential recipient of an incoming call can have telephone calls to a specific telephone number (e.g., home phone) forwarded to a selected telephone number corresponding to a location at which the recipient may be located (e.g., friend's home). Such a system, however, does not provide the incoming caller with any means for selecting how to establish contact with the recipient.

Another system for facilitating communication between parties, whereby the incoming caller can select a means for establishing contact with the recipient, concerns voice mail or message systems. In situations where the party being telephoned has not answered the incoming telephone call, voice message systems invite the incoming caller to leave a message for the party being telephoned. In voice mail systems, such as internal voice mail systems for offices, the system generally allows an incoming caller to choose between leaving a message for the person called (e.g., leaving a voice mail message by transferring the incoming call to a voice mail box) or communicating with an office receptionist such that the receptionist can transcribe a message for the party.

SUMMARY OF THE INVENTION

Accordingly, it is a primary object of the present invention to provide a system and method for facilitating communication between persons.

It is another object of the present invention to provide an incoming caller increased ability to efficiently and economically communicate with a selected party.

It is yet another object of the present invention to provide a call processing system and service which allows a number

2 of parties (e.g., persons) to share a single telephone number and provide a method by which an incoming caller to the single telephone number can communicate with at least one of the parties via the single telephone number.

The present invention achieves one or more objectives by providing a multiple extension routing system. In one aspect of the invention, the present invention contemplates a system for rerouting an incoming call from an incoming caller to a single telephone number to at least one of a plurality of destination telephone numbers corresponding to at least one of a plurality of parties (e.g., persons) capable of being reached via the single telephone number. In one embodiment, the system comprises a means for playing at least a first message comprising at least one routing option to the incoming caller, means for processing at least a first input from the incoming caller in response to the first message and means for rerouting the incoming call to at least a first destination telephone number, which corresponds to the first of the plurality of persons capable of being reached via the single telephone number.

In one aspect of the present invention, the system further comprises a means for suspending termination of the incoming call. In this regard, it has been recognized that a termination attempt trigger, available in AIN 0.1 termination call model at a central office switch (e.g., service switching point), may be triggered upon encountering an incoming call to suspend call processing of the incoming call (e.g., termination of the incoming call). Such suspension of the incoming call allows the system to provide a plurality of routing options to the incoming caller and to reroute the incoming call in accordance with inputs from the incoming caller in response to the plurality of routing options. In this regard, upon suspension of the incoming call by the AIN termination attempt trigger, a message (e.g., "Termination_Attempt") may be sent by the central office switch to the means for processing, which instructs the means for playing at least the first message to play the first message to the incoming caller to provide the incoming caller with the plurality of routing options.

In one embodiment, the means for playing at least the first message comprises a device capable of storing messages and playing such messages. In this regard, the means for playing may comprise an intelligent peripheral. Furthermore, as the means for playing is primarily responsible for interfacing with the incoming caller, the means for playing may further comprise a means for receiving and collecting inputs from the incoming caller in response to at least the first message. In this regard, the means for receiving may, in one embodiment, collect and decode dual tone multiple frequency (DTMF) (e.g., "touch tone") inputs from the incoming caller in response to the first message. In an alternative embodiment, the means for receiving may comprise a voice recognition system, whereby spoken inputs from the incoming caller in response to the first message may be recognized and processed.

The means for processing is capable of receiving inputs from the incoming caller via the intelligent peripheral to determine the destination telephone number to which the incoming call should be routed. In one embodiment, the processing means comprises a service control point system containing service logic and data needed to match the data provided by the incoming caller with the destination telephone numbers corresponding to the plurality of parties and/or plurality of means by which communication to a selected party may be established. In this regard, the processing means examines the input(s) from the incoming caller and directs or instructs the means for rerouting to route the incoming call to the first destination telephone number, which corresponds to the party selected by the incoming caller.

The means for rerouting functions to receive the incoming call to the single telephone number and to route the incoming call to the first of the plurality of destination telephone numbers. In one embodiment, the means for rerouting comprises a central office switch (e.g., a service switching point). In a preferred embodiment, the central office switch is AIN capable and comprises at least a termination call model which invokes a termination attempt trigger. In this regard, upon receipt of an incoming call to the single telephone number, the central office switch is capable of suspending call processing and triggering the means for playing, via the means for processing, to play the first message to the incoming caller in order to reroute the incoming call to a desired destination telephone number. As noted hereinabove, the rerouting means is also capable of rerouting the incoming call to at least a first destination telephone number. In this regard, the rerouting means routes the incoming call according to at least the first input received from the incoming caller via the playing means and processing means. Thus, upon receipt of instructions from the processing means indicating the destination telephone number to which the incoming call should be rerouted, the rerouting means comprising a central office switch routes the incoming call to the appropriate destination telephone number.

To achieve one or more of these objectives, the present invention also includes a method for connecting an incoming call from an incoming caller to a single telephone number to at least a first of a plurality of destination telephone numbers corresponding to at least a first of a plurality of persons capable of being reached via the single telephone number. In this regard, the incoming call may be rerouted from a single telephone number (e.g., a "virtual" telephone number shared by a plurality of persons) to at least one of a plurality of destination telephone numbers (e.g., multiple extensions), which is different from the single telephone number. According to one embodiment, the method may comprise the steps of playing at least a first message to the incoming caller to provide at least a first plurality of routing options to the incoming caller, processing at least a first input from the incoming caller indicative of a first selected routing option, and rerouting the incoming call from the single telephone number to at least the first of a plurality of destination telephone numbers. In this embodiment, the first of the plurality of destination telephone numbers may correspond to at least the first selected routing option.

In another aspect of the invention, the method of the present invention may further comprise the steps of suspending call processing of the incoming call (e.g., termination) and sending a message (e.g., "Termination_Attempt") to execute and commence the step of playing the first message to the incoming caller. In this regard, an incoming call would encounter an AIN termination attempt trigger in a central office switch, which suspends call processing. Suspending the incoming call thus provides the incoming caller the opportunity to select a party and/or the manner by which communication with the selected party be established.

The first plurality of routing options may correspond to a plurality of parties capable of being reached via the single telephone number and/or the means by which communication may be established to a selected party. In one embodiment of the method of the present invention, the first message played to the incoming caller comprises a first plurality of routing options corresponding to a plurality of parties. In another embodiment, the first message played to the incoming caller comprises a first plurality of routing options corresponding to a plurality of parties and the manner in which communication can be established to such parties.

In another aspect of the method of the present invention, the method may further comprise the steps of playing at least a second message to the incoming caller after the first input from the incoming caller is processed and processing at least a second input from the incoming caller indicative of at least a second selected routing options. In one embodiment, a second message may be played to the incoming caller to provide the incoming caller the opportunity to choose the manner in which communication with the selected party may be established. Thus, where the incoming caller has selected a first of the plurality of parties with whom the incoming caller wishes to communicate, the incoming caller may, thereafter, select the means by which communication with the first party will be established. In this regard, processing the first input from the incoming caller in response to the first message concerns determining the party selected by the incoming caller, while processing the second input from the incoming caller in response to the second message concerns determining the manner by which communication with the party selected by the incoming caller is to be established and the destination telephone number corresponding to such manner of communication to the selected party.

In a further aspect of the invention, the method of the present invention may further comprise the steps of recording a plurality of second messages from at least a first of the plurality of parties capable of being selected by the incoming caller in response to the first message, receiving the first input from the incoming caller indicative of the first of the plurality of persons capable of being selected by the incoming caller and selecting a first of the plurality of second messages, wherein the first of the plurality of second messages corresponds with the second message recorded by the first of the plurality of persons. In this regard, once the incoming caller has chosen the party to whom the incoming call shall be rerouted, the incoming caller may hear a second message in the voice of the chosen party, the second message comprising the means by which communication may be established between the incoming caller and the chosen (e.g., selected) party.

In yet another aspect, the method of the present invention may also comprise the steps of replaying the first message to enable the incoming caller to reroute the incoming call from the first of the plurality of destination telephone numbers to a second of the plurality of destination telephone numbers, processing at least a second input from the incoming caller indicative of a second selected routing option and rerouting the incoming call from the first to the second of the plurality of destination telephone numbers. In this regard, the method of the present invention allows the incoming caller to change or vary the routing of the destination telephone number. In one embodiment, the method may further comprise the step of processing an exception, per the AIN termination call model, from the first of the plurality of destination telephone numbers which may automatically trigger replaying of the first message to the incoming caller. In this regard, the step of processing the exception may include the step of determining whether communication between the incoming caller and the selected party has been established or whether an exception was noted at the destination telephone number (e.g., busy signal, transfer to voice mail box, no answer (e.g., 4 or more telephone rings)).

In yet another aspect of the present invention, a subscriber of the call processing service may review and/or modify at least one of the messages (e.g., greetings) playable to an incoming caller and/or the data associated therewith. In one embodiment, the method of the present invention may comprise the steps of playing at least a first of a plurality of messages to a first of the subscribers, processing at least a first input from the first subscriber in response to at least one of the plurality of messages, and modifying at least one of the greetings to the incoming caller and associated data of the particular subscriber in accordance with the subscriber's input(s). In this embodiment, a subscriber may modify the greeting (e.g., the first and/or second messages playable to an incoming caller) in the intelligent peripheral and the appropriate data, which is stored in the service control point. As such, any of a plurality of routing options (e.g., destination telephone numbers, long distance carrier, time of day or day of week routing options) may be added, deleted or modified by the subscriber according to the principles of the present invention.

DETAILED DESCRIPTION

The multiple extension routing system of the present invention is generally used to allow an incoming caller to reach any one of a number of persons (e.g., family member, business associate) via a single telephone number. In this regard, the system of the present invention allows a number of entities (e.g., family members, corporate departments) to share a single telephone number to facilitate communication between an incoming caller to the single telephone number and at least one selected individual.

Figure 1:
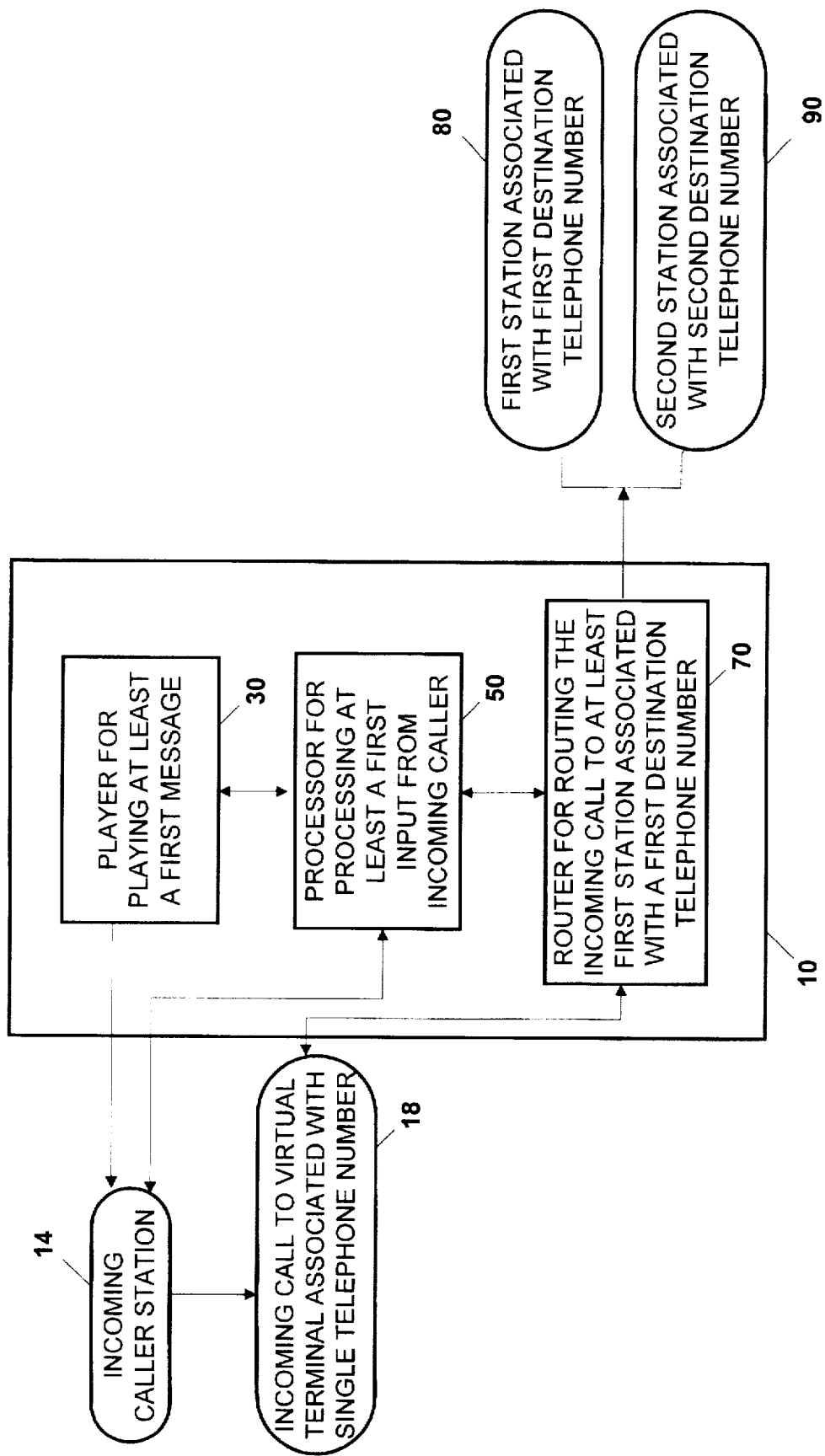
FIG. 1 is a diagrammatic illustration showing one embodiment of the multiple extension routing via an AIN system according to the principles of the present invention.

FIG. 1 is a block diagram which generally illustrates the multiple extension routing system 10 according to the principles of the present invention. The system 10 may generally comprise a means 30 for playing at least a first message to the incoming caller 14, a means 50 for processing at least a first input from the incoming caller in response to the first message and a means 70 for rerouting the incoming call 18 from the single telephone number to at least a first destination telephone number 80, the first destination telephone number 80 being in accordance with at least the first input from the incoming caller, which corresponds to a selected individual having the first destination telephone number. In this regard, the system 10 allows a number of individuals to share a single telephone number by facilitating communication between the incoming caller 14 and a selected individual. As such, the system 10 may be especially useful to contact a member of a group, such as a family member and/or one of a number of business associates, as only a single telephone number need be called by an incoming caller to communicate with any one member of the group.

Figure 2:
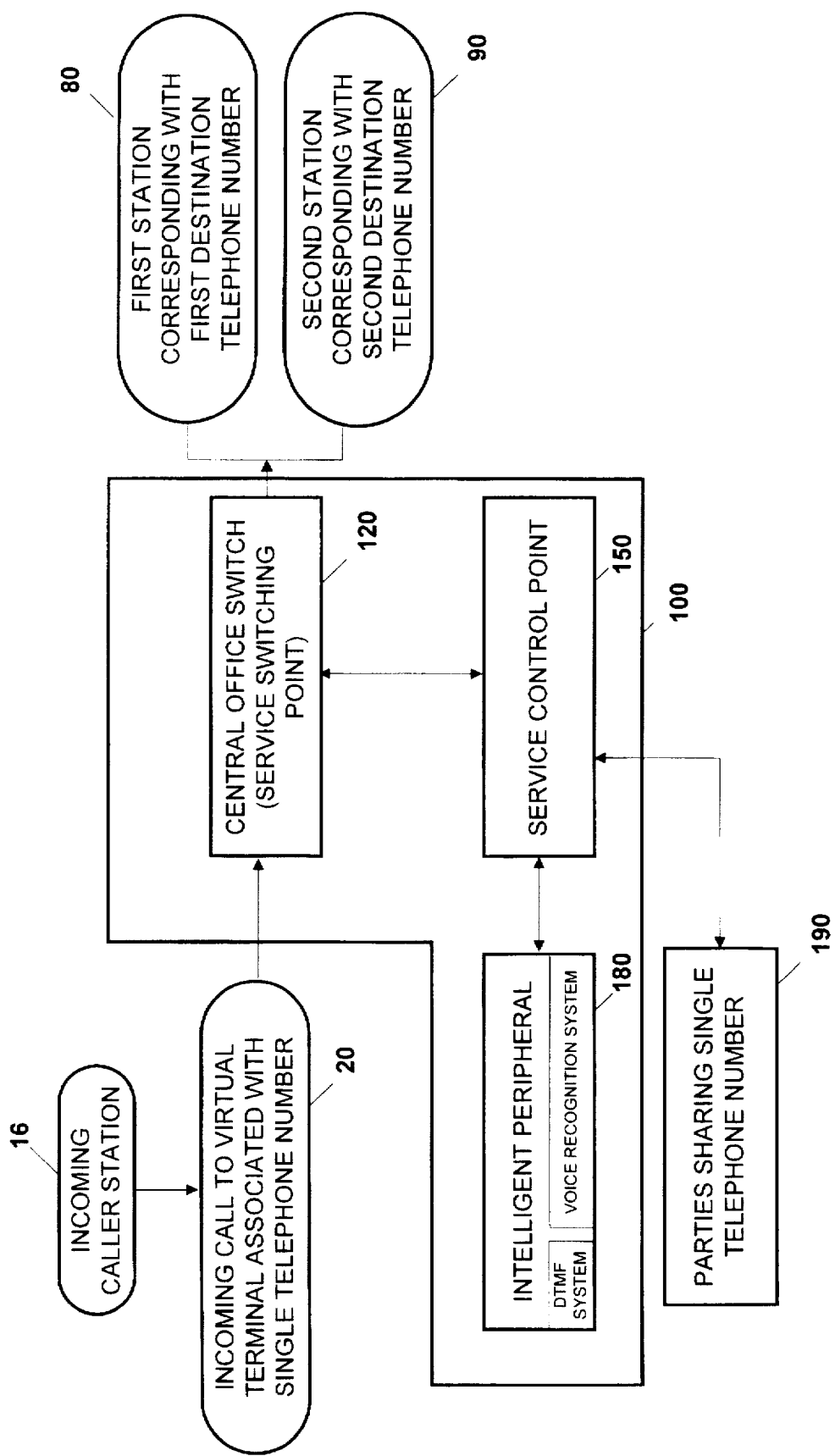
FIG. 2 is a diagrammatic illustration showing another embodiment of the multiple extension routing via an AIN system according to the principles of the present invention.
Figure 3:
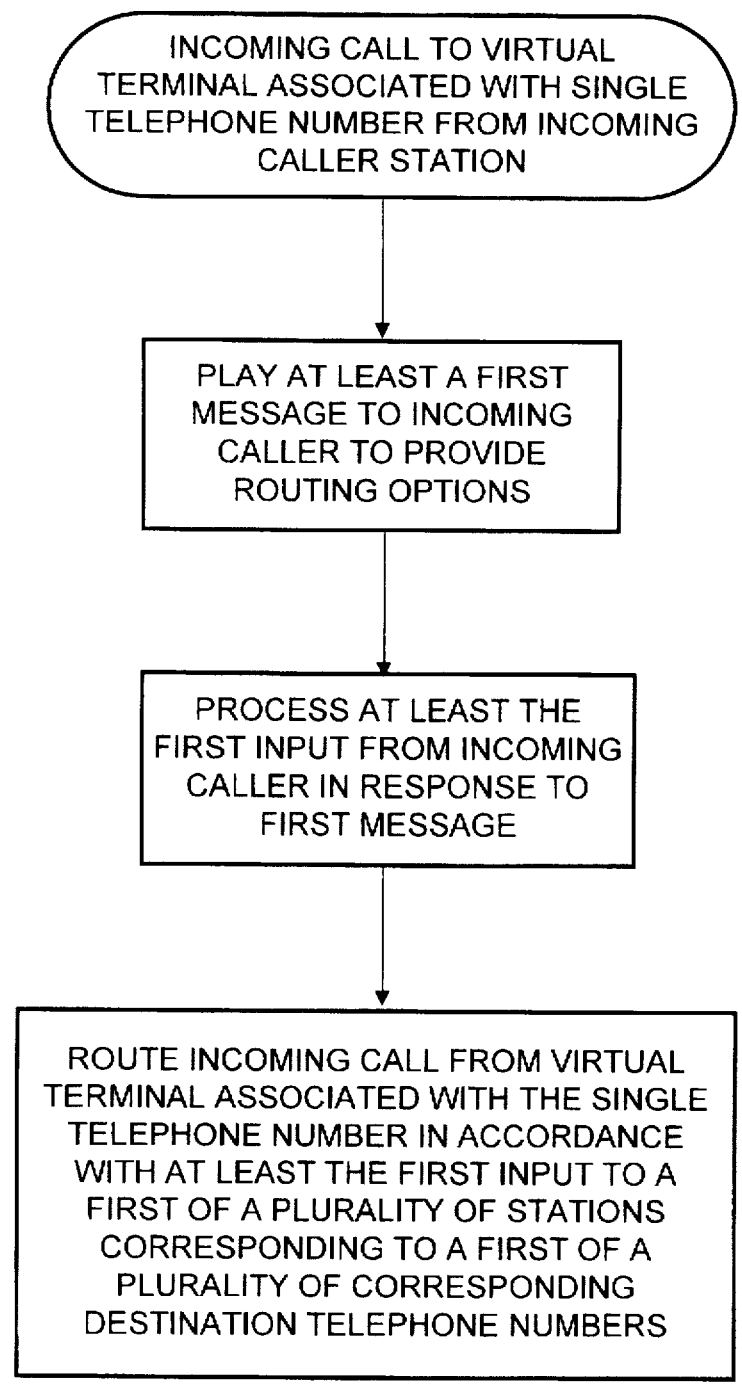
FIG. 3 presents a flow chart of the call rerouting process according to one embodiment of the present invention.

FIG. 2 illustrates a block diagram of an embodiment of the multiple extension routing system according to the principles of the present invention. In this embodiment, the system 100 generally comprises a central office switch (e.g. service switching point) 120 which is capable of routing telephone calls and a service control point 150 for processing information received from the incoming caller via an intelligent peripheral 180. More specifically, upon receipt of an incoming call 20 to a single telephone number, a termination attempt trigger of the central office switch 120 communicates a message to the service control point 150, which thereby instructs the intelligent peripheral 180 to provide at least a first message to the incoming caller 16 and to collect any inputs received from the incoming caller 16 in response to the message(s). Generally, the input received from the incoming caller 16 may correspond to a person with whom the incoming caller 16 desires to communicate and/or a manner in which such communication is to be established. The intelligent peripheral 180 may then communicate the input(s) received from the incoming caller 16 to the service control point 150. The service control point 150 processes the information received from the incoming caller 16 via the intelligent peripheral 180 to determine to which of the destination telephone numbers the incoming call 20 should be directed. In this regard, the destination telephone number to which the incoming call 20 will be rerouted corresponds to at least the person and/or manner of communication selected by the incoming caller 16 to communicate with a selected person. The service control point 150 may then instruct the central office switch 120 to route the incoming call 20 from the single telephone number to the destination telephone number selected by the incoming caller 16, thereby enabling the incoming caller 16 to communicate with the desired individual.

In one embodiment of the present invention, the central office switch 120 functions as a service switching point by having the capability to suspend processing of incoming calls and to reroute incoming calls to a specific destination. In order to function as a service switching point, in a preferred embodiment, the central office switch 120 is AIN capable, that is, having at least the 0.1 release of the AIN software. In this regard, the central office switch 120 is capable of functioning as a state driven system, that is, a system which acts pursuant to an event or an occurrence. More specifically, the AIN capable central office switch 120 may include a termination call model, specifically, a termination attempt trigger, wherein upon encountering an incoming call 16, the switch 120 invokes the termination attempt trigger to trigger the service control point 150 to communicate with the incoming caller 16 via the intelligent peripheral 180 (which will be described in more detail hereinbelow). In this regard, the central office switch 120 is capable of suspending call processing and sending, for example, a "Termination_Attempt" message to the service control point 150, which, in turn, causes the service control point 150 to instruct the intelligent peripheral 180 to play at least a first message to the incoming caller 16.

The central office switch 120 may comprise a 5ESS or a 1ASS switch, which are commercially available from AT&T. Alternatively, the central office switch 120 having at least AIN 0.1 capability may comprise a DMS-100 switch, which is commercially available from Nortel, or an AXE10 switch, which is commercially available from Ericsson. In addition, for purposes of having AIN capability, the central office switch may comprise the AIN 0.1 compliant software, which is commercially available from various vendors.

For purposes of initiating communication of at least a first message to the incoming caller 16 and processing any inputs received from the incoming caller 16 in response to such messages, the system 10 utilizes a service control point 150. In this regard, the service control point 150 contains the service logic for conducting multiple extension routing according to the principles of the present invention and data associated with routing the incoming call 20 to at least one of the destination telephone numbers. More specifically, for purposes of providing the incoming caller 16 with at least a first message comprising a plurality of routing options, the service control point 150 is capable of directing an intelligent peripheral 180 to play at least a first message to the incoming caller 16. In one embodiment, the plurality of routing options corresponds to one or more persons, which, in turn, may correspond to a plurality of destination telephone numbers to which the incoming call 20 to the single telephone number may be rerouted. In this regard, the service control point 150 may send a "Play_And_Collect" message to the intelligent peripheral 180, which instructs the intelligent peripheral 180 to interface with the incoming caller 16 in order to obtain information from the incoming caller 16 such that the service control point 150 may determine to which of the plurality of destination telephone numbers the incoming call 20 to the single telephone number should be rerouted. In this regard, the service control point 150 may instruct the intelligent peripheral 180 to commence playing at least a first message to the incoming caller 16.

In order to play at least a first message to the incoming caller 16, the intelligent peripheral 180 is capable of storing and playing a plurality of messages. In this regard, the messages to be played to the incoming caller 16 may be recorded on tape or, alternatively, digitally stored. As noted hereinabove, the first message played to the incoming caller 16 by the intelligent peripheral 180 may comprise a first plurality of routing options. The first plurality of routing options may generally correspond to a plurality of destination telephone numbers to which the incoming call may be rerouted. In this regard, the incoming caller 16 may communicate with a selected person as the system 10 is capable of rerouting the incoming call 20 to at least one of the destination telephone numbers corresponding to the person selected by the incoming caller.

For example, in one embodiment, where the system 10 is configured to reroute an incoming call 20 from a single telephone number to a plurality of destination telephone numbers corresponding to a plurality of persons, the first plurality of routing options played by the intelligent peripheral 180 to the incoming caller 16 to the single telephone number may comprise a message similar to the following: "To reach John Doe, please press 1; to reach Jane Smith, please press 2; to reach Bob Brown, please press 3; to reach Mary Jones, please press 4." In this regard, the intelligent peripheral 180 is capable of storing and playing a message comprising a plurality of options which correspond to a number of persons who can be contacted via the single telephone number.

As the intelligent peripheral 180 is primarily used to interface with the incoming caller 16, the intelligent peripheral 180 is also capable of receiving and collecting information from the incoming caller 16, the information being indicative of the party to whom the incoming caller 16 wishes the incoming call 20 be rerouted. In one embodiment, the intelligent peripheral 180 is capable of receiving and collecting dual tone multiple frequency (DTMF) inputs from the incoming caller 16. For example, where the incoming caller 16 has a "touch tone" telephone and presses the number "1" in response to the above-noted first message, the intelligent peripheral 180 receives and collects the DTMF input from the incoming caller 16. In this regard, the intelligent peripheral 180 may further comprise a DTMF decoder, which is commercially available. In another embodiment, the intelligent peripheral 180 may further comprise a voice recognition system, whereby the intelligent peripheral 180 is capable of receiving and collecting information spoken by the incoming caller 16 in response to the first plurality of routing options.

Information (e.g., DTMF input, verbal) provided by the incoming caller 16 in response to the first plurality of routing options may be collected by the intelligent peripheral 180 and sent to the service control point 150 for processing. In this regard, the service control point 150 is capable of processing the information provided by the incoming caller 16 to determine the routing desired by the incoming caller 16. In one embodiment, the service control point 150 receives inputs from the incoming caller 16 via the intelligent peripheral 180 and instructs the central office switch 120 to reroute the incoming call 20 to a specific destination telephone number corresponding to a person or party selected by the incoming caller 16, as will be described in more detail hereinbelow.

In another embodiment, the service control point 150 receives inputs from the incoming caller 16 in response to the first message via the intelligent peripheral 180 and determines whether a second message should be played to the incoming caller 16. In this embodiment, a first message may concern the party to whom the incoming caller 16 wishes the single telephone call be rerouted, while a second message may concern how communication to the party selected by the incoming caller 16 should be established. In this regard, the intelligent peripheral 180 cooperates with the service control point 150 to provide the incoming caller 16 at least first and second messages comprising a first and second plurality of routing options. For example, the service control point 150 may instruct the intelligent peripheral 180 to play a first message comprising a first plurality of routing options to the incoming caller 16. The intelligent peripheral 180 may then play to the incoming caller 16 a message similar to the following: "To reach John Doe, please press 1; to reach Jane Smith, please press 2; to reach Bob Brown, please press 3; to reach Mary Jones, please press 4." As noted hereinabove, inputs from the incoming caller 16 in response to the first message, namely, DTMF inputs corresponding to the party to whom the incoming caller 16 wishes the incoming call 20 to the single telephone number be rerouted, may be received and collected by the intelligent peripheral 180 and sent on to the service control point 150 for processing.

Such processing by the service control point 150 may generally include determining the routing of the incoming call 20 and/or directing the intelligent peripheral 180 to play a second message to the incoming caller. In instances where communication to the party to whom the incoming call 20 is to be rerouted can be established only by a single means (e.g., via cellular telephone), the service control point 150 may receive an input from the intelligent peripheral 180 indicative of the party to whom the incoming caller 16 has selected the incoming call 20 be rerouted and instruct the central office switch 120 to reroute the incoming call 20 to the single telephone number to the selected party's cellular telephone number.

In instances where communication to the party to whom the incoming call 20 is to be rerouted can be established by a plurality of means, the service control point 150 may receive a second input from the incoming caller 16 via the intelligent peripheral 180 and direct the central office switch 120 to reroute the incoming call 20 to the selected party in the manner directed by the incoming caller 16. For example, in response to the first message regarding the party to whom the incoming caller 16 wishes the incoming call 20 be rerouted, the service control point 150 may receive and process the first input from the incoming caller 16 via the intelligent peripheral 180 and determine whether a second message to the incoming caller 16 should be played. In instances where the party selected by the incoming caller 16 can be reached by a plurality of means, the service control point 150 instructs the intelligent peripheral 180 to play a second message to the incoming caller 16. The second message may comprise a second plurality of routing options indicative of ways in which the incoming caller 16 may establish communication with the party selected by the incoming caller 16. For example, the second message may comprise a recording similar to the following: "To reach John Doe by voice at my home, please press 1; by voice at my business, please press 2; by pager, please press 3; by facsimile at my business, please press 4; by facsimile at my home, please press 5; by cellular, please press 6; or to leave me a message, please press 7." In response to the second message, the incoming caller 16 may select the manner in which communication to the selected party may be established by providing a second input via a DTMF input. The intelligent peripheral 180 receives the second input from the incoming caller 16, and communicates this input to the service control point 150, which determines the routing destination which has been selected by the incoming caller 16. This routing information is then communicated to the central office switch 120, which reroutes the call to the selected destination telephone number. In another embodiment, the second message may comprise time sensitive routing options that may be provided by one or more of the parties. In this regard, at least one of the parties may provide potential incoming callers with a daytime plurality of routing options and/or an evening plurality of routing options. The service control point 150 and the intelligent peripheral 180 are commercially available from Bellcore (e.g., an Intelligent Service Control Point (ISCP) and an Intelligent Service Point (ISP), respectively). In an alternative embodiment, instead of intelligent peripherals, AIN services could use DMS-100 switches to play announcements (e.g., first and/or second messages), receive and collect responses from the incoming caller and to reroute the incoming call. In order to facilitate reception and processing of the inputs from the incoming caller 16 indicative of the desired rerouting, at least one of the service control point 150 and the intelligent peripheral 180 may comprise a DTMF decoder, or, alternatively, a voice recognition system, both of which are commercially available.

In one embodiment, the second message, namely, the second plurality of routing options, provided to the incoming caller may be recorded by one or more of the parties to whom the incoming call 20 may be rerouted. For example, in instances where the incoming call 20 to the single telephone number may be rerouted to four parties, one or more of the parties may record a second message to be played to the incoming caller in order to allow the incoming caller to choose the manner in which communication will be established with the selected party. In this regard, the intelligent peripheral 180 may also be capable of recording a plurality of messages.

As noted above, the service control point 150 is primarily responsible for processing inputs received from the incoming caller 16 via the intelligent peripheral 180 in order to determine the destination telephone number to which the central office switch 120 should reroute the incoming call 20. In this regard, the service control point 150 contains the service logic and data (e.g., destination telephone numbers) needed to formulate the instructions for rerouting the incoming call 20, which comprise the destination telephone number to which the incoming call 20 should be rerouted by the central office switch 120. For example, in instances where the incoming caller 16 has chosen to communicate with a selected party via voice at the selected party's place of business, the service control point 150 determines which of the destination telephone numbers corresponds with the selected party's voice business telephone number, and instructs the central office switch 120 to reroute the incoming call 20 by providing the central office switch 120 with the appropriate destination telephone number. In addition, in instances where the destination telephone number corresponding to the selected party and manner in which communication is to be established is a long distance telephone call, the service control point 150 may also determine over which long distance service the incoming call 20 should be rerouted. In this regard, the service control point 150 is also capable of formulating data to provide the central office switch 120 a long distance access code (e.g., 288 for AT&T long distance) along with the destination telephone number to which the central office switch 120 will reroute the incoming call 20. Instructions from the service control point 150 to the central office switch 120 to reroute the incoming call 20 to a first destination telephone number may comprise a message such as "Authorize_Termination" or "Forward_Call".

In another embodiment, where the incoming caller 16 has provided at least a first input and the central office switch 120 has rerouted the incoming call 20 to the destination telephone number corresponding to the party selected by the incoming caller 16, the incoming caller 16 may communicate with the party, so long as the party answers the telephone, or the facsimile machine establishes a link with the rerouted incoming call. However, as there may be instances in which no answer is received, or a busy signal is received, or the rerouted incoming call is routed to a voice mail box, the present invention contemplates enabling the incoming caller to kick back or return to the main menu comprising the first message. In instances where the selected party does not answer, or a busy signal is heard, or incoming call is routed to a voice mailbox, the present invention allows the incoming caller 16 the opportunity to select another manner by which communication may be established to the first selected party (e.g., via a second destination telephone number 90), or, alternatively, the opportunity to select a second party to which the incoming call should be rerouted. In this regard, the AIN capable central office switch 120 is capable of exception processing, per the AIN call termination model, whereby the incoming caller 16 is provided an option to hear a replay of the first message comprising a plurality of options if the call to the first destination telephone number is not answered within a specified number of rings or the first destination telephone number is busy. In such instances, the incoming caller 16 may hear a replay of the first message corresponding to a first plurality of routing options and/or a second message corresponding to the modes by which communication may be established.

The "virtual" or single telephone number to which an incoming caller 16 may "dial" in order to reach any one of a plurality of parties (e.g., persons) may comprise a standard telephone number (e.g., a local household or business telephone number). Alternatively, the single telephone number may comprise a "1-800" or a "1-888" toll-free telephone number. In yet another embodiment, a number of parties may wish to share a personal "1-500" telephone number.

In another aspect of the present invention, the system 100, shown in FIG. 2, provides the plurality of parties 190 sharing the single telephone number flexibility in the entry and management of routing options (e.g., greetings) and/or associated data. For example, any of the parties 190 (e.g. subscribers) may review or alter the above-described first and/or second messages (e.g., greetings) playable to the incoming callers or the plurality of routing options available to incoming callers to reach a selected party by interfacing with the service control point 150 via the intelligent peripheral 180. In this regard, a subscriber 190 of the service may review or change any of the plurality of routing options corresponding to the subscriber 190, such as destination telephone numbers (e.g., adding a business facsimile telephone number) and long distance carrier used, or the subscriber's message(s) to be played to an incoming caller (e.g., alter the greeting comprising the means by which communication may be established). A "master" party may also interface with the intelligent peripheral 180 and service control point 150 to add or delete a person.

Specifically, in one embodiment, a subscriber 190 may access the intelligent peripheral 180 to modify the greetings stored therein. The subscriber may also access the service control point 150 to vary the data stored therein via the intelligent peripheral 180. The subscriber 190 may use, for example, a DTMF interface (e.g., touch tone telephone), or alternatively, a voice recognition interface (e.g., voice recognition unit) to communicate with the intelligent peripheral 180 and/or the service control point 150. The intelligent peripheral 180 is capable of playing at least a first of a plurality of messages to a subscriber 190 and receiving input(s) from the subscriber 190 indicative of any alterations made by the subscriber 190. Any addition, deletions or alterations in the subscriber's greeting(s) may then be stored in the intelligent peripheral 180, and, if desired, any additions, deletions or alterations associated therewith may be sent to and stored in the service control point 150, which incorporates such changes into its database.

For purposes of security, each of the subscribers 190 may be required to enter a personal identification number (e.g., 4-digit DTMF code) or a spoken password in order to review and/or to modify the subscriber's greeting and/or data associated therewith. In addition, a "master" personal identification number may be assigned to a party (e.g., a subscriber of the number sharing group) for purposes of administering the system 100 (e.g., adding or deleting subscribers to/from the system).

As illustrated in FIGS. 3–6, the method of the present invention generally concerns rerouting an incoming call to a single telephone number to at least a first of a plurality of destination telephone numbers, wherein the first of a plurality of destination telephone numbers corresponds to a first of a plurality of parties (e.g., persons who share the single telephone number). In this regard, in order to reroute the incoming telephone call to a first of a plurality of destination telephone numbers, the method of the present invention contemplates playing at least a first message to the incoming caller to provide a plurality of routing options to the incoming caller. As noted above, an intelligent peripheral 180 may store and play such messages to the incoming caller. Upon hearing a plurality of routing options, the incoming caller may select at least the person to whom the incoming call should be rerouted by providing a first input, which is indicative of at least a first selected routing option. The first input may then be processed to determine to which of the plurality of destination telephone numbers the incoming call is to be rerouted. Processing such inputs from the incoming caller may be conducted by a service control point 150. Thereafter, the incoming call may be rerouted from the single telephone number to at least the first of the plurality of destination telephone numbers, which corresponds to the person or party selected by the incoming caller in response to at least the first message. The rerouting of the incoming call from the single telephone number to the first of the plurality of destination telephone numbers may be conducted by an AIN 0.1 capable central office switch 120 (e.g., a service switching point).

The method of the present invention may further comprise the steps of suspending call processing of the incoming call (e.g., termination) and sending a message (e.g., "Termination_Attempt") to execute and commence the step of playing the first message to the incoming caller. In this regard, an incoming call may encounter an AIN termination attempt trigger in a central office switch, which suspends call processing, which provides the incoming caller the opportunity to choose to where and how the incoming call will be rerouted. Thus, the AIN termination attempt trigger suspends processing of the incoming call to allow the incoming caller to select one of the plurality of parties (e.g., subscribers) sharing the single telephone number and/or the means by which communication will be established to the selected party.

In one embodiment of the method of the present invention, the first message may comprise a plurality of routing options corresponding to persons to whom the incoming call can be rerouted and/or means by which communication with a selected party may be established. For example, the first message to the incoming caller to the single telephone number may comprise a message similar to the following: "To reach John Doe, please press 1; Jane Doe, please press 2; John Smith, please press 3." Alternatively, the first message may comprise a message similar to the following, in which both the person and the manner in which communication is to be established is provided: "To reach John Doe by voice at his place of business, please press 1; to reach John Doe by pager, please press 2; to reach Jane Doe by voice at home, please press 3; to reach Jane Doe by cellular, please press 4; to reach John Smith by voice at home, please press 5; to reach John Smith by facsimile at his place of business, please press 6."

Figure 4:
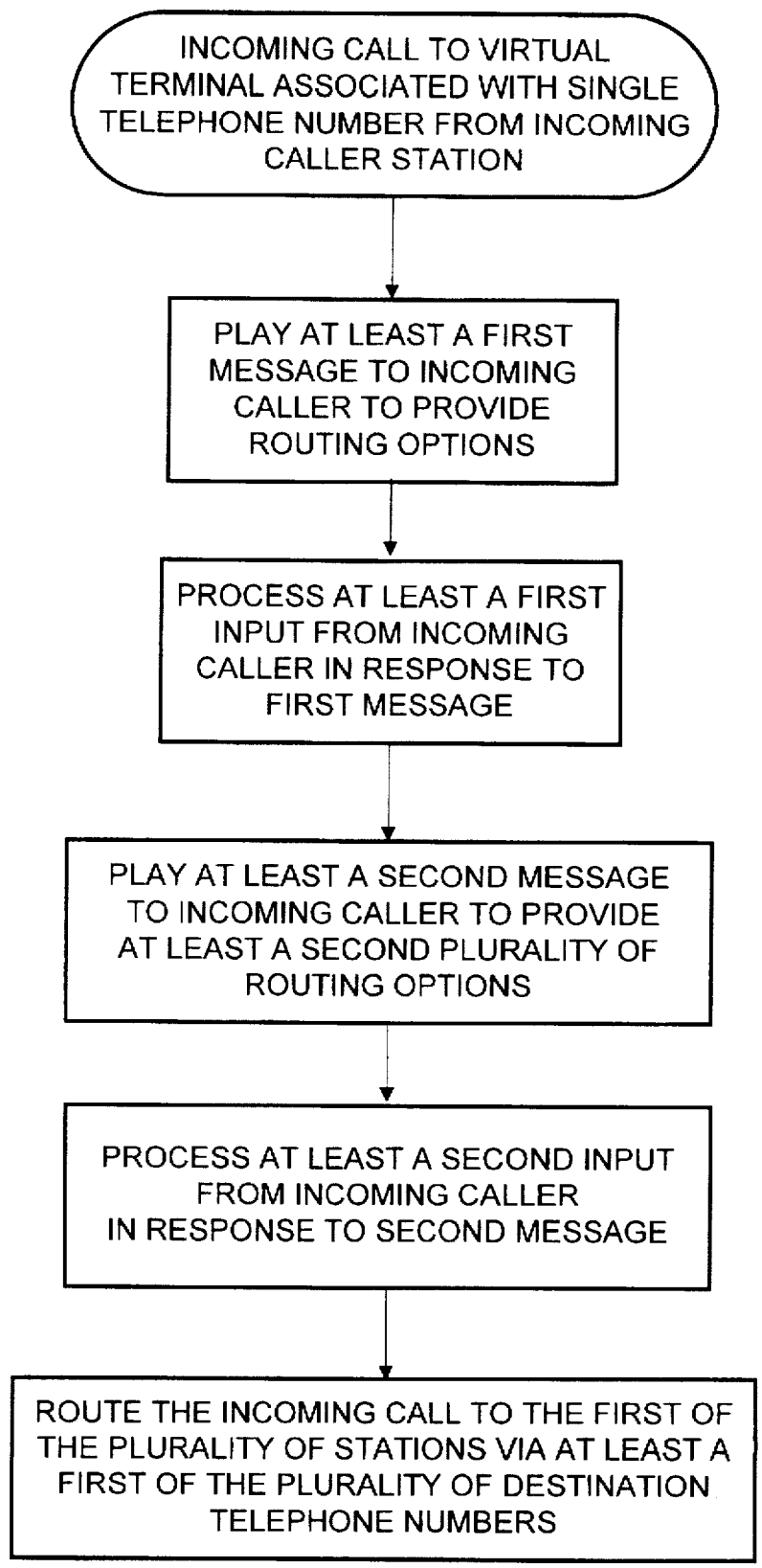
FIG. 4 presents a flow chart of another embodiment of the call rerouting process of the present invention.

In another embodiment of the method of the present invention, illustrated in FIG. 4, the method of the present invention may further comprise, after playing a first message to the incoming caller and processing at least a first input from the incoming caller in response to the first message, playing a second message comprising a second plurality of routing options to the incoming caller. In this embodiment, the first message comprising a first plurality of routing options may concern the parties to whom the incoming call may be rerouted while the second message comprising a second plurality of routing options may comprise the manner in which communication between the incoming caller and the selected party may be established. In this regard, the method of the present invention may also comprise processing a second input from the incoming caller in response to the second message. In this embodiment, rerouting the incoming call to the single telephone number to the first of the plurality of destination telephone numbers is based upon at least two criteria, namely, the person to be contacted and the manner by which communication is to be established to the selected party.

Figure 5:
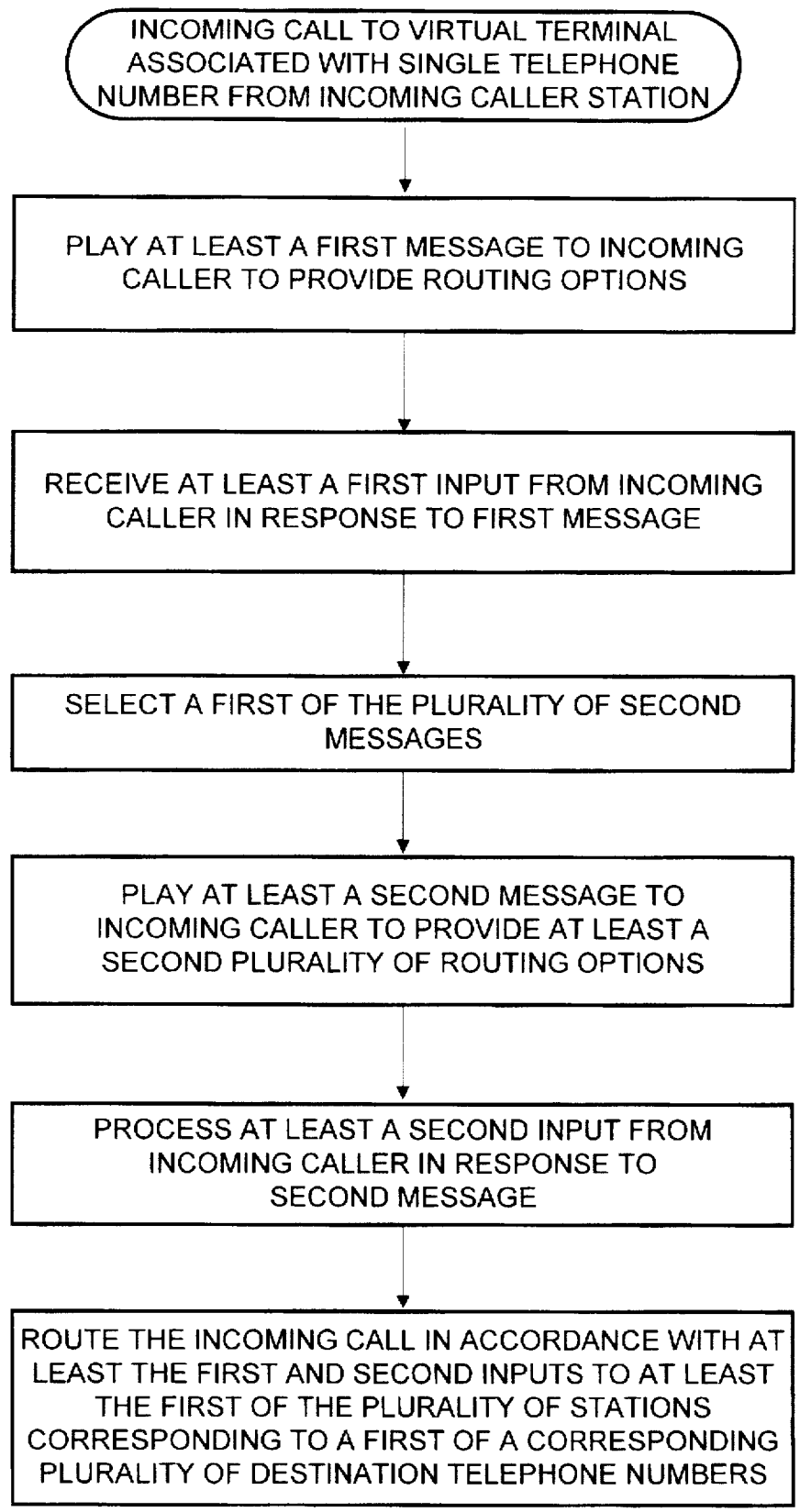
FIG. 5 presents a flow chart of the call rerouting process according to yet another embodiment of the present invention.

The process of the present invention may further comprise recording a plurality of second messages by at least a first plurality of persons capable of being selected by the incoming caller in response to the first message, as illustrated in FIG. 5. In this regard, the incoming caller may listen to a message concerning the manner in which communication may be established, wherein the message is recorded by the party with whom the incoming caller wishes to communicate. In one embodiment, an intelligent peripheral may be used to both record messages and to play such messages to the incoming caller.

As illustrated in FIG. 4, in one embodiment, the method comprises the steps of receiving at least a first input from the incoming caller in response to a first message played to the incoming caller and processing the first input from the incoming caller in order to select a first of the plurality of second messages to be played to the incoming caller. In instances where the first message to the incoming caller concerns the party with whom the incoming caller wishes to communicate, and the first input is indicative of party selected by the incoming caller, the first of the plurality of second messages played to the incoming caller may comprise a message recorded by the selected party. In this regard, the process of the present invention may also include the step of selecting a first of the plurality of second messages, wherein the first of the plurality of second messages corresponds to the party selected by the incoming caller in response to the first message.

Processing at least the second input from the incoming caller, in response to the second message, primarily concerns the destination telephone number to which the incoming call to a single telephone number will be rerouted. In this regard, processing at least the second input from the incoming caller comprises determining the destination telephone number to which the service switching point should reroute the incoming call and communicating with the service switching point (e.g., central office switch) to reroute the incoming call to the destination telephone number corresponding at least to the person selected by the incoming caller, and, in a preferred embodiment, corresponding to the manner of contact (e.g., by voice at home, by voice at business, by facsimile at business, by pager or by cellular), as selected by the incoming caller.

Figure 6:
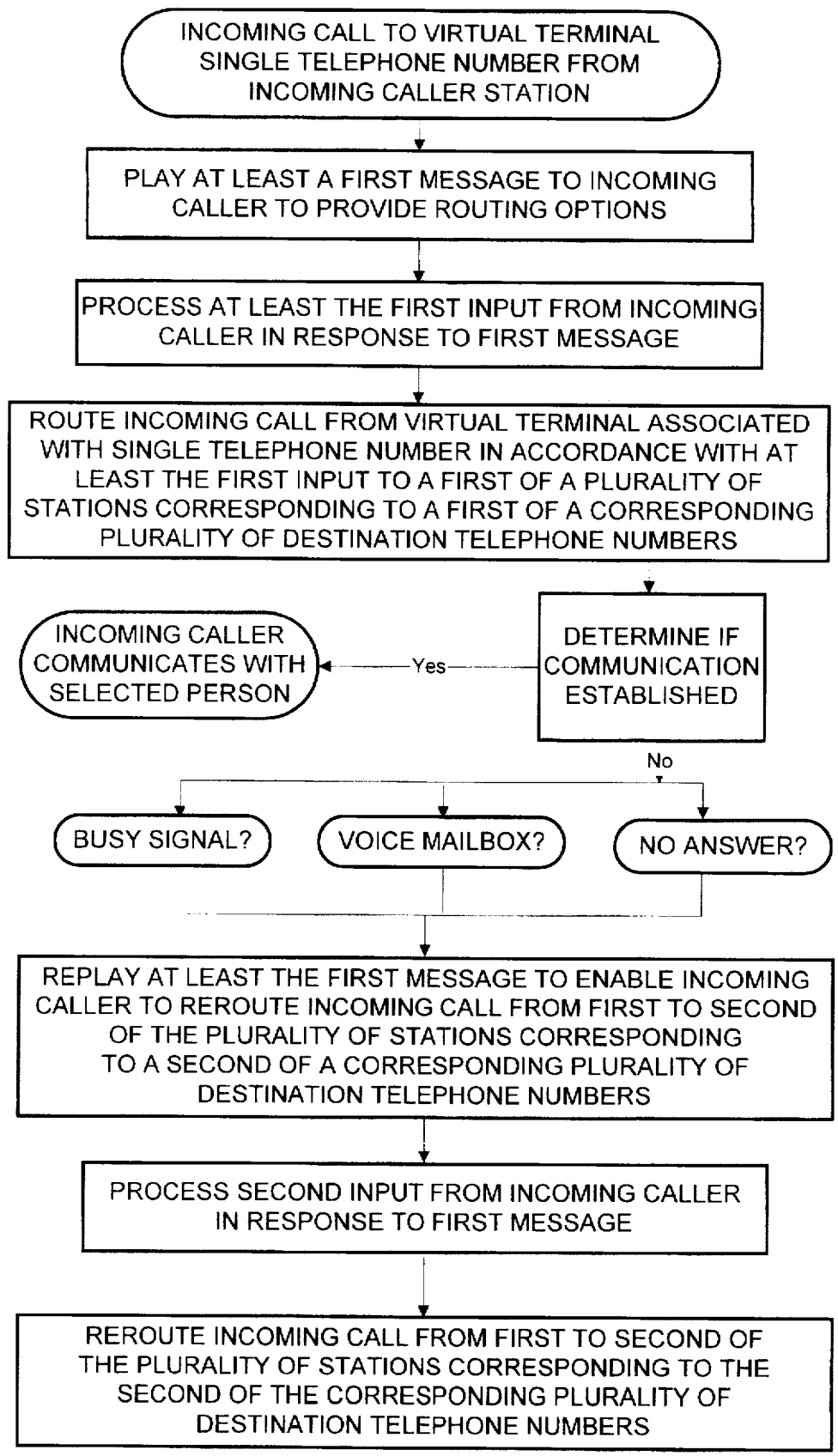
FIG. 6 presents a flow chart of another embodiment of the call rerouting process of the present invention.

As illustrated in FIG. 6, in another embodiment of the method of the present invention, the method may further comprise sending or kicking the incoming caller back to the main menu (e.g., first message comprising a first plurality of routing options) to enable the incoming caller to select a different manner in which to contact the first of the plurality of persons (e.g., the first selected party), or alternatively, to select a second party with whom to communicate. In this embodiment, after rerouting an incoming caller to a first of a plurality of destination telephone numbers corresponding to the first selected person, person-to-person communication may not be established as the incoming caller may receive a busy signal, get transferred to a voice mail box, or may receive no answer (e.g., 5–6 rings). In order to provide the incoming caller with at least a second opportunity to establish the manner of communication or, alternatively, to choose a second of the plurality of persons to contact, the method of the present invention provides for the step of determining whether communication between the incoming caller and the first selected party has been established. If, at the first destination telephone number, a busy signal is noted, or a voice mail box is invoked, or a plurality of rings are noted by the system (e.g., the AIN capable central office switch 120), the method of the present invention contemplates replaying at least the first message to the incoming caller to enable the incoming caller to reroute the incoming call from the first to a second of the plurality of destination telephone numbers. Input(s) from the incoming caller in response to such message(s) may be received and processed in order to determine the destination telephone number to which the incoming caller has directed the incoming call be rerouted. As note hereinabove, processing such inputs may be conducted by a service control point 150. Thereafter, the incoming call may be rerouted a second time to the second of the plurality of destination telephone numbers.

Figure 7:
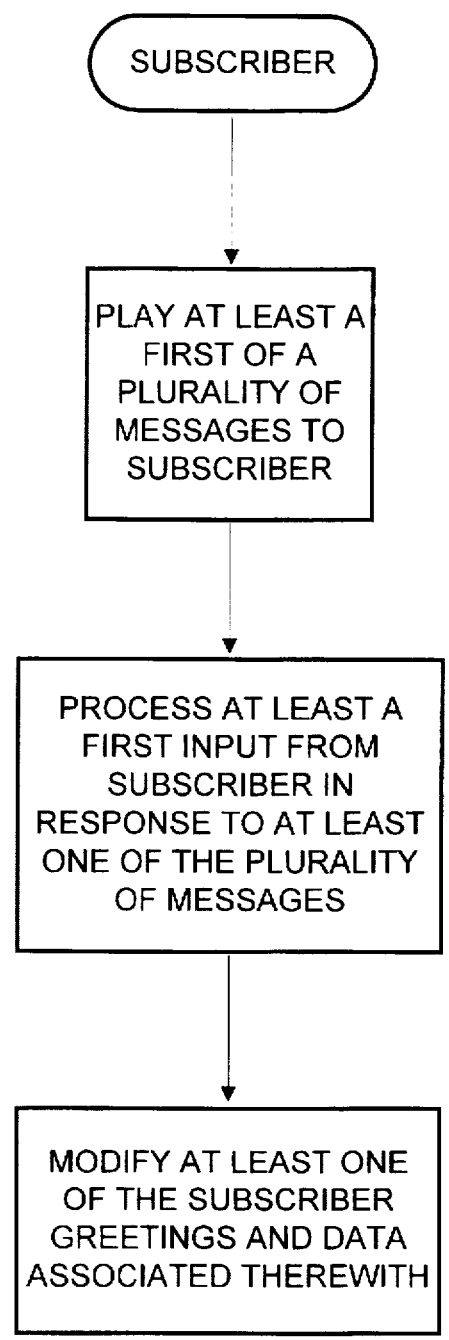
FIG. 7 presents a flow chart of another aspect of the present invention.

Referring to FIG. 7, in another aspect of the present invention, for purposes of reviewing and/or modifying the content of the first and/or second messages playable to the incoming caller (e.g., greeting(s)) and/or the data associated therewith, the method of the present invention may comprise the steps of playing at least a first of a plurality of messages to a first of the subscribers, processing at least a first input from the subscriber in response to at least one of the plurality of messages played to the subscriber, and modifying at least one of the greetings of the particular subscriber and associated data in accordance with the subscriber's input(s). Modifying a greeting and/or the associated data may be conducted by reprogramming the appropriate greeting and the data, which are stored in the intelligent peripheral and service control point, respectively.

In one embodiment, where a subscriber to the call processing service of the present invention desires to review and/or add, delete and/or modify the subscriber's destination telephone numbers available to incoming callers, a subscriber may access the service control point 150 via the intelligent peripheral 180, as illustrated in FIG. 2. Furthermore, in order to provide an incoming caller with a greeting corresponding to the revised or modified set of destination telephone numbers, a subscriber should correspondingly alter the greeting playable to an incoming caller, which is stored in the intelligent peripheral. The subscriber may also modify the long distance service, if any, needed to reroute incoming calls to a specific destination telephone number. The modified routing options may thereafter be stored in the service control point's database.

More specifically, for purposes of modifying a greeting playable to an incoming caller, a subscriber may communicate with the intelligent peripheral 180 via, for example, a touch tone telephone. Once connected, in one embodiment, the intelligent peripheral 180 plays a message to the subscriber to prompt the subscriber to enter (e.g., DTMF) or speak a personal identification code or password, respectively, in order to gain authorized access to the system. If access is granted, the intelligent peripheral 180 may play a series of messages to the subscriber 190 corresponding to a greeting and/or data capable of being reviewed and/or modified by the subscriber 190. For instance, the intelligent peripheral 180 may play a recording instructing the subscriber 190 to press 1 to modify a greeting (e.g., rerecord), press 2 to modify, add or delete destination telephone numbers, press 3 to change long distance carriers, or press 4 to change time of day or day of week options. Inputs from the subscriber 190 may be collected by the intelligent peripheral 180 and communicated to the service control point 150 for processing. In this regard, if a subscriber 190 desires to delete a destination telephone number, the database of the service control point 150 may be reprogrammed accordingly, and the subscriber 190 may rerecord a greeting playable to an incoming caller wherein the routing option corresponding to the deleted destination telephone number has been deleted.

In instances where, for example, a routing option corresponding to a destination telephone number of a subscriber 190 is no longer desired (e.g., for subscriber's cellular telephone number), a subscriber 190 may simply access and communicate with the intelligent peripheral to rerecord a greeting playable to an incoming caller, wherein the rerecorded greeting does not provide incoming callers with a routing option corresponding to the subscriber's cellular telephone destination telephone number. Since an incoming caller will not have as a routing option the subscriber's cellular telephone, the data associated with the cellular telephone, namely, the destination telephone number, need not be deleted. In this regard, reprogramming the data associated therewith in the service control point is not required in such instances. As such, an incoming caller can still communicate with the subscriber via the subscriber's cellular telephone by selecting the routing option formerly corresponding to the subscriber's cellular telephone as the database has not been reprogrammed to delete the cellular telephone destination telephone number. Such capability may be especially useful for a subscriber who wishes to cut cellular telephone costs by limiting the number of incoming calls reroutable to the subscriber's cellular telephone. However, substantially as described hereinabove, the database in the service control point may be reprogrammed to delete, for example, the cellular telephone destination telephone number if desired.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for routing an incoming call from an incoming caller to a first virtual terminal with which a single telephone number is associated to at least a first of a plurality of terminals associated with a corresponding plurality of destination telephone numbers, the plurality of destination telephone numbers corresponding to a plurality of persons capable of being reached by the incoming caller who dials the single telephone number, wherein at least one of the plurality of destination telephone numbers is different from the single telephone number, comprising the steps of:

playing at least a first message to the incoming caller to provide a first plurality of routing options to the incoming caller;

processing at least a first input from the incoming caller indicative of a first selected routing option, the first selected routing option being chosen by the incoming caller in response to the first message and corresponding to a first of the plurality of persons;

playing a first of a plurality of second messages to the incoming caller to provide the incoming caller a second plurality of routing options to allow the incoming caller to select at least a first of a plurality of modes by which the incoming caller can contact the first of the plurality of persons, wherein the first of the plurality of second messages corresponds to the first of the plurality of persons;

processing a second input by the incoming caller, wherein the second input corresponds to the first of the plurality of modes by which the incoming caller can contact the first of the plurality of persons; and routing the incoming call from the first virtual terminal associated with the single telephone number to at least the first of the plurality of terminals associated with a first of the plurality of destination telephone numbers, the first of the plurality of terminals corresponding to the first of the plurality of persons and the first of the plurality of modes, the first of the plurality of destination telephone numbers being different than the single telephone number.

2. A method, as claimed in claim 1, further comprising, before said step of playing at least the first message, the steps of:

suspending completion of termination of the incoming call; and sending a termination attempt message to execute said step of playing the first message to the incoming caller.

3. A method, as claimed in claim 1, wherein the first plurality of routing options corresponds to the plurality of persons that may be reached by the incoming caller.

4. A method, as claimed in claim 1, wherein said step of processing at least the first input from the incoming caller comprises the steps of:

receiving at least the first input from the incoming caller; and directing a call routing system to route the incoming call to at least the first of the plurality of terminals associated with the first of the plurality of destination telephone numbers.

5. A method, as claimed in claim 1, wherein said step of processing the first input from the incoming caller comprises the steps of:

receiving the first input from the incoming caller; and selecting the first of the plurality of second messages.

6. A method, as claimed in claim 1, further comprising, after said step of routing the incoming call to the first of the plurality of terminals corresponding to the first of the plurality of destination telephone numbers, the steps of:

replaying at least one of the first and second messages;

processing, in response to one of the first and second messages, another input from the incoming caller indicative of one of a second selected routing option corresponding to a second of the plurality of persons and a second of the plurality of modes by which the incoming caller can contact the first of the plurality of persons; and rerouting the incoming call from the first to a second of the plurality of terminals corresponding to the second of a plurality of destination telephone numbers, wherein the second of the plurality of terminals corresponds to one of the second of the plurality of persons and the second of the plurality of modes for reaching the first of the plurality of persons.

7. A method, as claimed in claim 6, further comprising, before said step of playing one of the first and second messages, the step of:

processing an exception associated with the first of the plurality of terminals associated with the first of the plurality of destination telephone numbers to trigger said step of playing the one of the first and second messages to the incoming caller.

8. A method, as claimed in claim 1, wherein said step of routing the incoming call is conducted by an Advanced Intelligent Network capable central office switch.

9. A method for routing an incoming call placed by an incoming caller to a first virtual terminal with which a single telephone number is associated, wherein at least one of a plurality of destination telephone numbers associated with a corresponding plurality of terminals is different from the single telephone number, wherein the plurality of destination telephone numbers corresponds to a plurality of persons capable of being reached by the incoming caller by dialing the single telephone number associated with the first virtual terminal, comprising the steps of:

playing at least a first message to the incoming caller to provide a plurality of routing options, wherein at least one of the plurality of routing options corresponds to at least one of the plurality of persons capable of being reached by the incoming caller;

processing at least a first input by the incoming caller in response to the plurality of routing options, wherein at least the first input corresponds to a first of the plurality of persons capable of being reached by the incoming caller;

playing a second message to the incoming caller to provide the incoming caller a second plurality of routing options to allow the incoming caller to select a first of a plurality of modes by which the incoming caller can contact the first of the plurality of persons;

processing a second input by the incoming caller, wherein the second input corresponds to the first of the plurality of modes by which the incoming caller can contact the first of a plurality of persons; and routing the incoming call to the first of the plurality of terminals corresponding to the first of the plurality of persons, the first of the plurality of terminals being associated with a first of the plurality of destination telephone numbers and the first of the plurality of modes.

10. A method, as claimed in claim 9, wherein said step of routing the incoming call is conducted by an Advance Intelligent Network capable central office switch.

11. A method, as claimed in claim 9, further comprising, before said step of playing at least the first message, the steps of:

suspending completion of termination of the incoming call; and sending a termination attempt message to execute said step of playing the first message to the incoming caller.

12. A system for routing an incoming call from an incoming caller to a single telephone number associated with a first virtual terminal to at least one of a plurality of terminals associated with a corresponding plurality of destination telephone numbers associated with at least one of a plurality of persons capable of being reached by the incoming caller who dials the single telephone number, said system comprising:

a player for playing to the incoming caller at least a first and a second message, said first message comprising at least one routing option;

a processor for processing at least a first input from the incoming caller in response to said first message, wherein said first input corresponds to a first of the plurality of persons capable of being reached, wherein said processor processes at least a second input from the incoming caller in response to said second message, said second message comprising at least a plurality of modes by which the incoming caller can contact the first of the plurality of persons capable of being reached; and a router for routing the incoming call to at least a first terminal associated with a first of the plurality of destination telephone numbers, wherein said first destination telephone number corresponds to the first of the plurality of persons capable of being reached and a first of the plurality of modes selected by the incoming caller for reaching the first of the plurality of persons.

13. A system, as claimed in claim 12, further comprising a means for suspending completion of termination of the incoming call, said suspending means comprising a termination attempt trigger.

14. A system, as claimed in claim 12, wherein said player for playing said first and second messages comprises an intelligent peripheral.

15. A system, as claimed in claim 14, wherein said player further comprises a receiver for receiving said first and second inputs from the incoming caller in response to said first and second messages.

16. A system, as claimed in claim 15, wherein said receiver comprises a system selected from the group consisting of voice recognition systems and dual tone multi-frequency decoder systems.

17. A system, as claimed in claim 12, wherein said processor for processing comprises a service control point system for examining said first and second inputs from the incoming caller and directing said router to route the incoming call to said first terminal associated with said first destination telephone number.

18. A system, as claimed in claim 12, wherein said router comprises an Advanced Intelligent Network capable central office switch.

19. A system, as claimed in claim 12, wherein at least one of said plurality of routing options corresponds to at least one of said plurality of terminals associated with said plurality of destination telephone numbers.

20. A method, as claimed in claim 1, wherein at least the first of the plurality of modes for communicating with the first of the plurality of persons corresponds to the first of the plurality of destination telephone numbers, and a second of the plurality of modes for communicating with the first of the plurality of persons corresponds to a second of the plurality of destination telephone numbers, wherein the second of the plurality of destination telephone numbers is different than the first of the plurality of destination telephone numbers and is different than the single telephone number.

21. A method, as claimed in claim 9, wherein at least the first of the plurality of persons is associated with the first and a second of the plurality of modes by which the incoming caller can contact the first of the plurality of persons, wherein the first and second of the plurality of modes correspond to the first and a second of the plurality of destination telephone numbers, the first and second of the plurality of destination telephone numbers being different from each other and different than the single telephone number.

* * * * *